3,380,942
AIR-DRYING, WATER-SOLUBLE, HALOGEN-
CONTAINING POLYMERIC COMPOSITION
John M. Menke, Morton Grove, Ill., assignor to Velsicol
Chemical Corporation, Chicago, Ill., a corporation of
Illinois
No Drawing. Filed June 8, 1964, Ser. No. 373,578
6 Claims. (Cl. 260—22)

ABSTRACT OF THE DISCLOSURE

An air-drying, water-soluble halogen-containing polymeric composition comprising the product of (1) esterifying
  (a) the Diels-Alder adduct of hexahalocyclopentadiene and maleic anhydride,
  (b) drying oil fatty acid,
  (c) polyhydroxyalcohol, and
  (d) polyhydroxy monocarboxylic acid until a reaction product is formed having an acid number of from about 30 to about 100; and
(2) reacting said reaction product with a basic material and water.

This invention relates to new air-drying, water-soluble polymeric compositions of matter and to a process for the production thereof. More particularly, this invention relates to new air-drying, water-soluble, halogen containing polymeric compositions prepared from the Diels-Alder adduct of hexahalocyclopentadiene and maleic anhydride, a polyhydroxy alcohol, a drying oil fatty acid, a polyhydroxy monocarboxylic acid and a basic substance.

Heretofore, air-drying, water-soluble polymeric compositions have been produced which have found considerable utility in paints and like coatings due to the elimination of the toxicity and fire hazards created by flammable organic solvents or thinners and to their ability to be readily extended or thinned with water. However, while these compositions have been widely used as described, the coatings therefrom are not entirely satisfactory from several viewpoints. In particular they are not satisfacotry with respect to flame retardance and fire resistance. These latter properties are highly desirable and necessary in coatings for many articles and structures, such as in buildings, partitions and the like. Particularly, coatings having these properties are especially useful on parts and interior surfaces of aircraft and naval vessels where fire is a constant hazard. Therefore, it is highly desirable that an air-drying, water-soluble polymeric composition be found having the property that when formulated into water-extended, organic solvent-free coating compositions and applied to the articles to be coated, they result in flame retardant and fire resistant coatings.

Therefore, it is one object of the present invention to provide air-drying, water-soluble polymeric compositions.

It is another object of this invention to provide air-drying, water soluble polymeric compositions which, when formulated into coating compositions and applied to articles to be coated imparts unusually high flame retardance to the coatings in addition to the desirable properties of conventional water-extended flammable solvent-free coatings.

Still another object of the present invention is to provide polymeric compositions which can be applied as aqueous solutions and which air-dry to water-insoluble, flame and fire retardant, flexible coatings.

These and other objects of the present invention will be readily apparent from the ensuing description.

The above objects can be accomplished by the process of the present invention. This process comprises esterifying the Diels-Alder adduct of hexahalocyclopentadiene and maleic anhydride, drying oil fatty acid, polyhydroxy alcohol, and polyhydroxy monocarboxylic acid until a reaction product is formed having an acid number of from about 30 to about 100; and reacting the said product with a basic material. The polymeric composition prepared by the above process is water-soluble, and upon application as a coating to articles to be coated air-dries to a flexible water-insoluble coating having high flame retardance and fire resistance. The flame retardant and fire resistant properties of the coatings are due to the presence of halogen in the polymeric composition contributed by the hexahalocyclopentadiene adduct. For the coatings to possess the desired excellent flame retardant properties it is preferred that the coating composition contain at least 5 percent bromine or at least 12 percent chlorine, or greater amounts of fluorine, based on the weight of solids, said halogen contributed by the hexahalocyclopentadiene adduct in the polymeric composition. The term "solids" denotes the polymeric material exclusive of any liquid diluents, including water, in the coating composition.

The Diels-Alder adduct of hexachlorocyclopentadiene and maleic anhydride is known to the art and is commonly called chlorendic anhydride. Chlorendic anhydride is commercially available. While adducts of other halocyclopentadienes can be prepared and successfully used herein, it is preferred to utilize chlorendic anhydride or the adduct of hexabromocyclopentadiene and maleic anhydride since the ingredients from which these adducts can be prepared are readily available. A suitable adduct can also be prepared from hexafluorocyclopentadiene and maleic anhydride.

The Diels-Alder adduct of hexabromocyclopentadiene and maleic anhydride can be readily prepared by heating a stirred mixture of hexabromocyclopentadiene and maleic anhydride, either in the presence of a solvent, such as toluene or xylene, or in the absence thereof. Temperatures of the order of 300° F., for example from about 200° to about 400° F., have been found to be satisfactory to effect the adduction reaction and temperatures of this order can be readily attained by refluxing the mixture of the reactants in xylene. The adduct is recovered from the reaction mixture by precipitation upon cooling and washing with pentane or the like to remove unreacted diene. The adduct can be purified by recrystallization from a hot benzene solution by adding relative non-solvents, such as hexane, thereto, or from xylene.

Another ingredient utilized in preparing the polymeric compositions of the present invention is termed "drying oil fatty acid." This term is commonly understood in the art and as used herein includes drying and semi-drying oil fatty acids, such as dehydrated castor oil fatty acids, soybean oil fatty acids, linseed oil fatty acids, tall oil fatty acids, tung oil fatty acids, oiticica oil fatty acids, safflower oil fatty acids, and the like. These drying oil fatty acids are commercially available. Combinations of these vegetable oil fatty acids can be used to control the drying time of the polymeric compositions and the flexibility of the coatings produced therefrom.

Another ingredient of the composition of the present invention is a polyhydroxy alcohol, of which the di-, tri- and tetrahydroxy alcohols are preferred. Although dihydroxy alcohols such as diethylene glycol; tetrahydroxy alcohols such as pentaerythritol; and low molecular weight trihydroxy alcohols, such as glycerol, can be used in many compositions, it is most preferred to utilize higher, molecular weight primary trihydroxy alcohols containing from about 4 to about 6 carbon atoms such as trimethylol ethane, trimethylol propane, and the like.

Still another ingredient utilized in the preparation of the polymeric composition of the present invention is a polyhydroxy monocarboxylic acid, which serves to link the previous ingredients together to provide a third-dimensional effect to the polymeric composition. To balance the functionalities of the three previous ingredients it is preferred that this ingredient contain one carboxylic acid group and two to three hydroxy groups. Exemplary of the preferred polyhydroxy monocarboxylic acids, is dimethylolopropionic acid, which is commercially available.

The above ingredients are reacted until a product of suitable acid number or value is formed. The reaction between carboxylic acid groups such as on the present adduct, and hydroxyl groups is known as esterification. The esterification reaction can be readily performed at a temperature of from about 300° F. to about 500° F., preferably from about 350° F. to about 450° F. To provide water solubility to the polymer, it is essential that the esterification reaction be stopped prior to completion so that the reaction product has an acid number or value of from about 30 to about 100.

To assist in providing a product having an acid number as described above, it is necessary to control the quantities of the ingredients within critical limits. Thus it is preferred to utilize from about 0.1 to about 1.2 moles of drying oil fatty acid per mole of hexahalocyclopentadiene-maleic anhydride adduct, from about 0.6 to about 0.9 mole of polyhydroxy alcohol per mole of the adduct, and from about 0.2 to about 1.5 moles of polyhydroxy monocarboxylic acid per mole of the adduct.

When the adduct of hexabromocyclopentadiene and maleic anhydride is utilized as the adduct ingredient, less adduct is required to provide flame retardant properties than when an adduct containing a lower molecular weight halogenated cyclopentadiene, such as hexachlorocyclopentadiene, is used. While the same amount of the former adduct can be used as when the latter adduct is used, it is preferred as being more economical to use a mixture of the hexabromocyclopentadiene adduct with an aryl or alkyl dicarboxylic acid or anhyride. Preferred dicarboxylic acids or anhydrides are phthalic acid or anhydride and adipic acid, althouhg others such as succinic acid, sebacic acid, azelaic acid, and the like may be used. Suitable mixtures which may be used in place of the adduct alone are those containing from about 5 to about 99 mole percent adduct of hexabromocyclopentadiene and maleic anhydride and from about 1 to about 95 mole percent dicarboxylic acid. These mixtures can be used in place of the adduct in the mole ratio determination of the quantities of ingredients utilized in preparing the compositions of the present invention.

The second step in the process of the present invention can be readily carried out by reacting the partially esterified reaction product of the first step with a suitable basic material, such as ammonium hydroxide, ammonia, the alkylamines, the alkanolamines, the cycloalkylamines, the cycloalkanolamines, the diamines, morpholine, pyridine, and the like. Preferred basic materials are the amines such as ammonia and the amines listed above. The term "amine" as used herein either alone or as a suffix denotes primary, secondary, and tertiary amines, and hydroxy and alkoxy substituted amines, such as dimethylaminoethanol, dimethylaminopropanol, and the like. To effect this step a stoichiometric amount, or a slight excess thereover, of basic material, based on the amount of carboxyl groups available in the partially esterified reaction product as determined by the acid number, is added to the said product. The said product and basic material, preferably in water, are stirred and heated until a homogeneous solution is formed. This solution constitutes the water-soluble polymeric composition of the present invention in solution.

The usefulness of the polymeric compositions of the present invention can be enhanced by the addition of organic coupling agents. Among the improvements afforded by the use of the said agents are a lowering of the viscosity of aqueous solutions of the polymeric compositions of the present invention, control of the evaporation rate when the coating solution is applied to the surface to be coated, and wetting of the substrate to provide better adherence upon application of the coating solution. Exemplary of the suitable coupling agents are alcohols such as isopropyl alcohol, tertiary butyl alcohol, and the like, and ether alcohols such as the liquid glycol ethers, for example, ethylene glycol monoethyl ether, diethylene glycol monoethyl ether, ethylene glycol monobutyl ether, diethylene glycol monobutyl ether, and the like. The liquid glycol ethers are commercially available and are marketed under the "Carbitol" and "Cellosolve" trademarks.

The water-soluble polymeric compositions produced by the process of the present invention can be further diluted with water to yield an aqueous solution of a desirable solids content. Other compositions and materials can be added to the polymeric compositions of the present invention to provide added advantages and improved properties to the finished product. Among these compositions and materials are drying agents, stabilizers, water-soluble resins, such as melamine-formaldehyde, urea formaldehyde or phenol-formaldehyde resins, trimethylol phenol, and the like.

The polymeric compositions of the present invention are preferably utilized with drying agents. Among the preferable drying agents are the commercially available, commonly known organo-metallic driers, such as the cobalt, lead, manganese, zinc or rare earth water soluble, water dispersible or emulsifiable driers. Another preferable drier for use as described herein is a combination of 1,10-phenanthroline, n-butyl alcohol and 2-ethylhexoic acid. Such a drier is "Active-8". Only minor amounts of these drying agents are required to provide excellent air drying properties in the finished coating compositions. For example, from about 0.02% to about 1% drier based on the weight of metal in the dryer as a percentage of the weight of solids in polymeric composition has been found satisfactory for this purpose.

The air-drying, water-soluble polymeric compositions of the present invention are useful as coatings which dry under atmospheric conditions to flame retardant coatings. The polymeric composition of the present invention can be used as the alkyd ingredient in conventional water-based coating formulations to produce commercially useful coating compositions which can be applied in the conventional manner.

The preparation of the water-soluble polymeric compositions of the present invention and their application will be more clearly understood from the following examples which are presented by way of illustration and are not intended to limit the scope of the invention.

Example 1.—Preparation of the reaction product of step 1

Chlorendic anhydride (775 g.), tall oil fatty acid (80 g.) "Pamak No. 1," linseed oil fatty acid (310.6 g.) "Veg. acid 520," trimethylol ethane (200 g.) and dimethylol propionic acid (98.4 g.) were charged with agitation into a 2 liter flask under a blanket of nitrogen gas. After the ingredients became liquid the nitrogen gas was released beneath the liquid surface to provide an inert atmosphere and to aid in removing the water formed during the reaction. The reaction mixture was heated at 380–400° F. for about 110 minutes until an acid number of 56 was attained.

Example 2.—Preparation of a water-soluble polymeric composition

When the reaction mixture described in Example 1 had cooled to 220° F., isopropyl alcohol (400 g.) was added, and at 140° F., dimethylaminoethanol (130 g.) and 1 liter of water heated to 120° F. were added. The resulting mixture was a solution of the polymeric composition of the present invention in water having a viscosity of $Z_3$ to $Z_4$ on the Gardner viscosity scale, a color of about 18 on the Gardner color scale, a pH of about 8.5 and a solids content of approximately 49%.

A portion of the above solution (100 g. based on the solids content) was mixed with 5% emulsified super cobalt drier (0.4 g.; 0.04% cobalt based on the weight of polymeric composition) and 6% emulsified manganese drier (0.03 g.; 0.04% cobalt based on the weight of polymeric composition) and 6% emulsified manganese drier (0.03 g.; 0.04% manganese based on the weight of polymeric composition) to form an air drying composition for use in coating objects.

Example 3.—Preparation of the reaction product of step 1

Chlorendic anhydride (387.5 g.), dehydrated castor oil fatty acid (195.5 g.), trimethylol ethane (100 g.) and dimethylol propionic acid (49.2 g.) were charged under a blanket of nitrogen gas with agitation into a 2-liter three-necked, round-bottom flask fitted with a water cooled condenser connected to a Dean-Stark trap, a mechanical stirrer, an internal thermometer and a gas inlet tube. After the ingredients became liquid the nitrogen gas was released beneath the surface of the liquid to provide an inert atmosphere. The reaction mixture was heated to 380° F. over a period of about 45 minutes and was maintained at 380°–390° F. for a period of about 4 hours while the water formed by the reaction mixture was collected in the Dean-Stark trap, until an acid number of 55 was attained.

Example 4.—Preparation of a water-soluble polymeric composition

When the reaction mixture described in Example 3 has cooled to 220° F. tertiary butyl alcohol (200 g.) was added, at 180° F. dimethylaminoethanol (65.5 g.) was added, and at 140° F. water (500 ml.) was added. The reaction mixture was gently heated during these additions to retard the rate of cooling, to facilitate stirring of the viscous solution, and to provide adequate time for thorough mixing of the ingredients. The resulting solution was a solution of the polymeric composition of the present invention in water having a viscosity of $Z_6$ on the Gardner viscosity scale, a color of about 12 on the Gardner color scale, and a solids content of about 54.5%.

A portion of the above solution (11.27 g.; 7.53 g. of solids) was mixed with 6% manganese drier solution (0.377 g.; 0.0226 g. manganese in solution) to form an air-drying composition. This composition was coated on a standard steel test panel by means of a 0.008 mil draw down bar. The coated panel was allowed to dry at room temperature.

Additional portions of the solution of the polymeric composition in water were mixed with lead and cobalt drier to form drying compositions as follows:

0.2% Pb—12.92 grams of solution (7.13 g. polymeric composition) were mixed with 0.08 gram of 24% lead drier.
0.5% Pb—14.06 grams of solution (7.75 g. polymeric composition) were mixed with 0.16 gram of 24% lead drier.
0.02% Co—11.83 grams of solution (6.53 g. polymeric composition) were mixed with 0.02 gram of 6% cobalt drier.
0.05% Co—13.15 grams of solution (7.24 g. polymeric composition) were mixed with 0.06 gram of 6% cobalt drier.

The drying compositions prepared above were coated on standard steel test panels by means of a 0.008 mil draw down bar. The coated panels were allowed to dry at room temperature yielding coatings, which had the following Sward hardness after the time indicated.

SWARD HARDNESS

| Time, hrs. after coating | Coating Solutions | | | |
|---|---|---|---|---|
| | 0.2% Pb | 0.5% Pb | 0.02% Co | 0.05% Co |
| 4 | 11 | 6 | 15 | 6 |
| 24 | 19 | 13 | 22 | 14 |
| 48 | 20 | 17 | 31 | 20 |
| 144 | 26 | 14 | 40 | 30 |

Example 5.—Preparation of the reaction product of step 1

Chlorendic anhydride (193.5 g.), linseed oil fatty acid (113 g.) "Veg Acid 520," trimethylol ethane (50.5 g.) and dimethylol propionic acid were charged into the apparatus described in Example 3 by the procedure described therein. The reaction mixture was heated to 380° F. over a period of ½ hour and maintained at about 380–385° F. for about 6 hours until an acid number of 51.3 was attained.

Example 6.—Preparation of a water-soluble polymer composition

When the reaction mixture described in the previous example had cooled to 220° F. tertiary butyl alcohol (106 g.) was added, at 180° F. dimethylaminoethanol (34.2 g.) was added, and at 140° F. water (262 ml.) was added. The resulting solution was a solution of the polymeric composition of the present invention in water having a viscosity of $Z_2$ on the Gardner viscosity scale, a color of about 13+ on the Gardner color scale and a solids content of 54.8%.

Drying solutions were prepared from portions of the above solution in the manner described in Example 4, as follows:

0.2% Pb—14.72 grams solution (8.08 g. polymeric composition) mixed with 0.07 gram of 24% lead drier.
0.5% Pb—16.63 grams solution (9.12 g. polymeric composition) mixed with 0.19 gram 24% lead drier.
0.02% Co—12.94 grams solution (7.1 g. polymeric composition) mixed with 0.02 gram 6% cobalt drier.
0.05% Co—15.83 grams solution (8.7 g. polymeric composition) mixed with 0.07 gram 6% cobalt drier.

These drying compositions were coated on standard steel test panels with a 0.008 mil draw down bar. The coated panels were allowed to dry at room temperature yielding coatings, which had the following hardness after the time indicated:

SWARD HARDNESS

| Time, hrs. after coating | Coating Solutions | | | |
|---|---|---|---|---|
| | 0.2% Pb | 0.5% Pb | 0.02% Co | 0.05% Co |
| 5 | 12 | 12 | 12 | 12 |
| 25 | 8 | 8 | 12 | 12 |
| 70 | 18 | 18 | 22 | 22 |

Example 7.—Preparation of the reaction product of step 1

Chlorendic anhydride (151.5 g.), dehydrated castor oil fatty acid (88.5 g.), trimethylol propane (21 g.) and dimethylol propionic acid (44 g.) were charged into the apparatus described in Example 3 by the procedure described therein. The reaction mixture was heated up to 380° F. over a period of 20 minutes and maintained at about 380°–390° F. for about 4½ hours until an acid number of 53 was attained.

Example 8.—Preparation of a water-soluble polymeric composition

When the reaction mixture described in the previous example cooled to 180° F., a solution of dimethylaminoethanol (28.4 ml.) in water (289 ml.) was added. The resulting mixture was heated to about 200° F. and stirred. Ethylene glycol monobutyl ether (50 ml.) "Butyl Cellosolve" was added with stirring to yield a clear tan to light brown solution of the polymeric composition in water having a viscosity of $Z_6$ on the Gardner viscosity scale, a color of 12 on the Gardner color scale and a solids content of about 52.5%.

Drying solutions were prepared from portions of the above solution in the manner of Examples 4 and 6 as follows:

0.2% Pb and 0.02% Co—19.42 grams solution (10.2 g. polymeric composition) mixed with 0.09 gram 24% lead drier and 0.03 gram 6% cobalt drier.

0.5% Pb and 0.05% Co—18.73 grams solution (9.83 g. polymeric composition) mixed with 0.21 gram 24% lead drier and 0.08 gram 6% cobalt drier.

0.4% Pb, 0.09% Co and 0.01% Mn—18.52 grams solution (9.75 g. polymeric composition) mixed with 0.16 gram 24% lead drier, 0.15 gram 6% cobalt drier and 0.02 gram 6% manganese drier.

These drying solutions were coated on standard steel test panels with a 0.008 mil draw down bar. The coated panels were allowed to dry at room temperature yielding coatings, which had the following hardness after the time indicated:

SWARD HARDNESS

| Time, hrs. after coating | Coating Solutions | | |
|---|---|---|---|
| | 0.2% Pb and 0.02% Co | 0.5% Pb and 0.05% Co | 0.4% Pb, 0.09% Co and 0.01% Mn |
| 2.8 | 7 | 6 | 7 |
| 7.7 | 13 | 13 | 13 |
| 31.7 | 37 | 37 | 39 |

Example 9.—Preparation of the reaction product of step 1

Clorendic anhydride (151 g.) dehydrated castor oil fatty acid (88.5 g.), 1,2,6-hexanetriol (44 g.) and dimethylol propionic acid (21 g.) were charged into the apparatus described in Example 3 by the procedure described therein. The reaction mixture was heated to 380° F. over a period of 20 minutes and maintained at about 380–385° F. for about 2¾ hours until an acid number of 57.2 was attained.

Example 10.—Preparation of a water-soluble polymeric composition

When the reaction mixture described in the previous example cooled to 220° F., diethylene glycol monobutyl ether (84 g.) was added, at 180° F. dimethylaminoethanol (26.8 g.) was added, and at 160° F. water (235 ml.) was added. The mixture was stirred to yield a solution of the polymeric composition in water having a viscosity of V on the Gardner viscosity scale, a color of 9 on the Gardner color scale and a solids content of 50%.

Drying solutions of the above solution were prepared as heretofore described as follows:

0.4% Pb, 0.09% Co and 0.01% Mn—17.11 grams solution (8.55 g. polymeric composition) mixed with 0.14 gram 24% lead drier, 0.13 gram 6% cobalt drier and 0.01 gram 6% manganese drier.

0.5% Pb and 0.05% Co—13.84 grams solution (6.92 g. polymeric composition) mixed with 0.01 gram 24% lead drier and 0.06 gram 6% cobalt drier.

The drying solutions were coated on standard steel test panels with a 0.008 mil. draw down bar. The coated panels were allowed to dry at room temperature.

Example 11.—Preparation of the reaction product of step 1

Chlordenic anhydride (151.5 g.), dehydrated castor oil fatty acids (88.5 g.), glycerine (31.6 g.) and dimethylol propionic acid (21 g.) were charged into the apparatus described in Example 3 by the procedure described therein. The reaction mixture was heated to 380° F. over a period of 15 minutes and maintained at that temperature for about 1¾ hours until an acid number of 55.5 was attained.

Example 12.—Preparation of a water-soluble polymeric composition

When the reaction mixture described in the previous example cooled to 220° F., diethylene glycol monobutyl ether (84 g.) was added, at 180° F. dimethylaminoethanol (26.8 g.) was added, and at 160° F. water (210 ml.) was added. The solution was stirred for ½ hour to yield a solution of the polymeric composition in water having a viscosity of L on the Gardner viscosity scale, a color of 7 on the Gardner color scale and a solids content of 50.3%.

The polymeric compositions of the present invention can be utilized as the alkyd ingredient in conventional water extended or thinned coating compositions, such as water-base paints. These compositions are particularly useful in paints and varnishes for painting interior surfaces of naval and aircraft vessels. The resulting coated surface is flame retardant.

I claim:

1. An air-drying, water-soluble, halogen-containing polymeric composition comprising the product of
   (1) esterifying
      (a) the Diels-Alder adduct of hexahalocyclopentadiene and maleic anhydride
      (b) from about 0.1 to about 1.2 moles of drying oil fatty acid per mole of said adduct,
      (c) from about 0.6 to about 0.9 mole of polyhydroxy alcohol per mole of said adduct and
      (d) from about 0.2 to about 1.5 moles polyhydroxy monocarboxylic acid per mole of said adduct until a reaction product is formed having an acid number of from about 30 to about 100; and
   (2) reacting said reaction product with a compound selected from the group consisting of ammonium hydroxide, ammonia, alkylamines, alkanolamines, cycloalkylamines, cycloalkanolamines, diamines, morpholine and pyridine.

2. An air-drying, water-soluble, halogen-containing polymeric composition comprising the product of
   (1) esterifying
      (a) the Diels-Alder adduct of hexahalocyclopentadiene and maleic anhydride,
      (b) from about 0.1 to about 1.2 moles of drying oil fatty acid per mole of adduct,
      (c) from about 0.6 to about 0.9 mole of polyhydroxy alcohol per mole of adduct, and
      (d) from about 0.2 to about 1.5 moles of polyhydroxy monocarboxylic acid per mole of adduct at a temperature of from about 300° F. to about 500° F. until a reaction product is formed having an acid number of from about 30 to about 100; and
   (2) reacting said reaction product with at least a stoichiometric amount of a compound selected from the group consisting of ammonium hydroxide, ammonia, alkylamines, alkanolamines, cycloalkylamines, cycloalkanolamines, diamines, morpholine and pyridine.

3. An air-drying, water-soluble, chlorine-containing polymeric composition comprising the product of
   (1) esterifying
      (a) chlorendic anhydride,
      (b) from about 0.1 to about 1.2 moles of drying oil fatty acid per mole of chlorendic anhydride,
      (c) from about 0.6 to about 0.9 mole of trihydroxy alcohol per mole of chlorendic anhydride, and
      (d) from about 0.2 to about 1.5 moles of polyhydroxy monocarboxylic acid per mole of chlorendic anhydride at a temperature of from about 300° to about 500° F. until a reaction product is formed having an acid number of from about 30 to about 100; and
   (2) reacting said reaction product with at least a stoichiometric amount of a compound selected from the group consisting of ammonium hydroxide, ammonia, alkylamines, alkanolamines, cycloalkylamines, cycloalkanolamines, diamines, morpholine and pyridine.

4. A process for the production of an air-drying, water-soluble, halogen-containing polymeric composition which comprises
(1) esterifying
(a) the Diels-Alder adduct of hexahalocyclopentadiene and maleic anhydride
(b) from about 0.1 to about 1.2 moles of drying oil fatty acid per mole of said adduct,
(c) from about 0.6 to about 0.9 mole of polyhydroxy alcohol per mole of said adduct and
(d) from about 0.2 to about 1.5 moles polyhydroxy monocarboxylic acid per mole of said adduct until a reaction product is formed having an acid number of from about 30 to about 100; and
(2) reacting said reaction product with a compound selected from the group consisting of ammonium hydroxide, ammonia, alkylamines, alkanolamines, cycloalkylamines, cycloalkanolamines, diamines, morpholine and pyridine.

5. A process for the production of an air-drying, water-soluble, halogen-containing polymeric composition which comprises
(1) esterifying
(a) the Diels-Alder adduct of hexahalocyclopentadiene and maleic anhydride,
(b) from about 0.1 to about 1.2 moles of drying oil fatty acid per mole of adduct,
(c) from about 0.6 to about 0.9 mole of polyhydroxy alcohol per mole of adduct, and
(d) from about 0.2 to about 1.5 moles of polyhydroxy monocarboxylic acid per mole of adduct at a temperature of from about 300° F. to about 500° F. until a reaction product is formed having an acid number of from about 30 to about 100; and
(2) reacting said reaction product with at least a stoichiometric amount of a compound selected from the group consisting of ammonium hydroxide, ammonia, alkylamines, alkanolamines, cycloalkylamines, cycloalkanolamines, diamines, morpholine and pyridine.

6. A process for the production of an air-drying, water-soluble, chlorine-containing polymeric composition which comprises
(1) esterifying
(a) chlorendic anhydride,
(b) from about 0.1 to about 1.2 moles of drying oil fatty acid per mole of chlorendic anhydride,
(c) from about 0.6 to about 0.9 mole of trihydroxy alcohol per mole of chlorendic anhydride, and
(d) from about 0.2 to about 1.5 moles of polyhydroxy monocarboxylic acid per mole of chlorendic anhydride at a temperature of from about 300° to about 500° F. until a reaction product is formed having an acid number of from about 30 to about 100; and
(2) reacting said reaction product with at least a stoichiometric amount of a compound selected from the group consisting of ammonium hydroxide, ammonia, alkylamines, alkanolamines, cycloalkylamines, cycloalkanolamines, diamines, morpholine and pyridine.

References Cited
UNITED STATES PATENTS

| | | | |
|---|---|---|---|
| 2,908,006 | 10/1959 | Greenlee | 260—47 |
| 2,909,501 | 10/1959 | Robitschek et al. | 260—40 |
| 2,933,520 | 4/1960 | Bader | 260—22 |
| 2,973,331 | 2/1961 | Kraft | 260—22 |
| 3,098,834 | 7/1963 | Jerabek | 260—22 |

OTHER REFERENCES

Patton: Alkyd Resin Technology, Interscience Manual 8, Interscience Pub. Chemical Abstracts, volume 54, No. 18, Sept. 25, 1960.

DONALD E. CZAJA, *Primary Examiner.*

R. W. GRIFFIN, *Assistant Examiner.*